United States Patent [19]

Miller, Jr.

[11] Patent Number: 4,946,595

[45] Date of Patent: Aug. 7, 1990

[54] PROCESS AND APPARATUS FOR RE-CYCLING ENGINE COOLANT

[75] Inventor: Robert C. Miller, Jr., Roseland, N.J.

[73] Assignee: FPPF Chemical Corporation Inc., Buffalo, N.Y.

[21] Appl. No.: 243,319

[22] Filed: Sep. 9, 1988

[51] Int. Cl.$^5$ .............................................. B01D 13/00
[52] U.S. Cl. .................................. 210/651; 210/767; 210/758; 210/759
[58] Field of Search ................ 210/767, 758, 759, 651

[56] References Cited

U.S. PATENT DOCUMENTS

| | | | |
|---|---|---|---|
| 2,384,553 | 9/1945 | Kiffer | 252/75 |
| 3,122,486 | 2/1964 | Skarstrom | 203/41 |
| 3,809,152 | 5/1974 | Boehmer | 252/75 |
| 4,149,985 | 4/1979 | Wilson | 252/74 |
| 4,160,740 | 7/1979 | Sweet, III | 252/75 |
| 4,392,972 | 7/1983 | Mohr et al. | 252/75 |
| 4,452,715 | 6/1984 | Hirozawa | 252/75 |
| 4,647,392 | 3/1987 | Darden et al. | 252/75 |
| 4,676,919 | 6/1987 | Zientek | 252/75 |
| 4,711,735 | 12/1987 | Gulley | 252/75 |
| 4,725,405 | 2/1988 | Cassin et al. | 252/75 |
| 4,728,452 | 3/1988 | Hansen | 252/75 |
| 4,793,403 | 12/1988 | Vataru et al. | 165/95 |

OTHER PUBLICATIONS

Conley, J. H. and Jamison, R. G., "Additive Package for Used Antifreeze," Engine Coolant Testing Second Symposium, ASTM STP 887, Roy E. Beal, Ed., American Society for Testing and Materials, Philadelphia, 1986, pp. 78–85, (only pp. 78–79 are included here).
Clifton, J. R., Rossiter, W. J. Jr., Brown, P. W., "Degraded Aqueous Glycol Solutions: pH Values and the Effects of Common Ions on Suppressing pH Decreases", Solar Energy Materials 12, North–Holland, Amsterdam, 1985, pp. 77–86.
Brochure, FPPF 4000 "Cooling System Treatment", Buffalo, N.Y., FPCT-6/87, 4 pages.
American Society for Testing and Standards, "Standard Method for Corrosion Test for Engine Coolants in Glassware", American National Standard ANSI/ASTM D 1384–70, (Reapproved 1975), Annual Book of ASTM Standards, Philadelphia, PA, pp. 34–42.

Primary Examiner—Paul Lieberman
Assistant Examiner—John F. McNally
Attorney, Agent, or Firm—Edwin T. Bean, Jr.; Martin G. Linihan; John C. Thompson

[57] ABSTRACT

A process for physically and chemically treating a used engine coolant containing one or more glycol and/or alcohol-based antifreeze components. The process includes the steps of oxidation with one or more known oxidizing agents, precipitation with one or more known salt forming agents and filtration through any suitable filtration membrane or other separation means.

A chemical additive has been developed for use in carrying out the process of the present invention which initiates and maximizes the amount of oxidation and precipitation occurring within the coolant composition, adds one or more suitable corrosion inhibitors and one or more known buffering agents in a sufficient amount to adjust the pH of the final solution to between about 9.5 and 10.5.

An apparatus for use in accordance with the process of the present invention for recycling the engine coolant is also described herein.

22 Claims, 2 Drawing Sheets

PROCESS AND APPARATUS FOR RE-CYCLING ENGINE COOLANT

FIELD OF THE INVENTION

This invention relates to internal combustion engine coolants comprising mixtures of glycols and/or alcohols, commonly known as antifreeze, and more particularly, to a process and apparatus for recycling used engine coolants.

BACKGROUND OF THE INVENTION

Antifreeze compositions are additives commonly used to lower the freezing point or increase the boiling point of water. Such additives primarily consist of one or more alcohol and/or glycol-based components. The most commonly used antifreeze component consisting of ethylene glycol. When added to an internal combustion engine cooling system at 50% volume concentration it affords the engine coolant contained therein freeze protection down to about −34° F. and antiboil protection up to about 235° F., depending on the pressure.

It is known that from the time the antifreeze is added to an aqueous-based engine cooling system the glycol and/or alcohol-based components of the antifreeze start to break down chemically into various organic acids. The organic acids produced are usually glycolic, formic and to a lesser extent oxalic and glyoxalic acids. The break down is confirmed by the pH of the engine coolant composition decreasing from a pH of about 10.0 downward toward a pH of 7.0.

Coolants circulating through an engine cooling system at a pH below 8.3 show a very corrosive effect on all metals comprising or located within the system. It is believed that at a pH of about 9 the corrosion effect starts and proceeds at a relatively slow rate until a pH of about 8.7 is reached. When the pH of the coolant is below 8.3 the corrosion proceeds at a very rapid rate. The less noble metals steel, iron and cast iron in a coolant system are the first to go into solution via the corrosion process. Low pH causes aluminum pitting which readily weakens the wall thickness of its respective components. Copper likewise corrodes and goes into solution. Zinc, used to strengthen silver solder in radiators, leaches out and weakens the solder so that leaks develop. The remaining impurities commonly found are suspended particulate matter primarily corrosion products (metal oxides), dirt, silt and hard water salt deposits.

Circulating coolant compositions generally include several known corrosion inhibitors. The inhibitors are added either directly to the coolant or included in the antifreeze solution added thereto which is sold as "inhibited antifreeze". However, typical corrosion inhibitors such as phosphates, silicates, borates, nitrites, nitrates, azols and molybdates are consumed over a period of time which further contributes to the corrosion effect on the engine cooling system.

It is generally accepted practice to remove and replace the coolant composition after a period of time. The initial coolant accumulates dissolved impurities and suspended particulate matter and looses effective corrosion inhibition and freeze protection capabilities with time. Although separate cooling system additives may be employed to neutralize degradation products accumulating in the system, these additives are primarily alkaline and include corrosion inhibitors, dispersants, polymers and sequestrants. Such compounds do not restore the depleted antifreeze components, i.e., glycol and/or alcohol, remove the impurities, nor increase the freeze protection or raise the boiling point of the degraded or used coolant, or inhibit further degradation of the glycol derivative.

Furthermore, a shortage of antifreeze, i.e., ethylene glycol is becoming predominately apparent throughout the United States. This will result in large increases in the price of antifreeze to the consumer. Also, in some states antifreeze is considered a hazardous waste and the Federal EPA and various State environmental agencies are imposing large fines on any facility that discharges antifreeze to the environment. Therefore, a need exists for a process of restoring or treating degraded or used engine coolants containing one or more antifreeze components to yield a recycled product which may be reintroduced into an internal combustion engine cooling system.

OBJECTS AND SUMMARY OF THE INVENTION

Accordingly, it is the primary object of the present invention to provide a process and apparatus for physically and chemically recycling a used coolant composition.

Another object of the present invention is to provide such a process and apparatus which utilizes oxidation, precipitation and filtration to recycle the used coolant composition.

Another object of the present invention is to provide an improved recycled coolant composition which exhibits a superior corrosion inhibition.

Another object of the present invention is to provide an improved recycled coolant composition which exhibits suppressed degradation characteristics of the glycol and/or alcohols.

Another object of the present invention is to provide improved recycled coolant composition which exhibits a final pH between about 9.5 and 10.5.

A process for physically and chemically treating a used cooling composition of the type used within an internal combustion engine cooling system, after removal from the system, to remove unwanted impurities and degradation by-products including dissolved metals, dirt, silt, salts and other unwanted suspended particulate matter contained therein, wherein the coolant composition contains one or more glycol and/or alcohol-based antifreeze components. The process comprises:

contacting the coolant composition with one or more known oxidizing agents in an amount sufficient to form metallic oxides from any unwanted dissolved metals present in the composition thereby forming particulate metallic oxide precipitates;

contacting the coolant composition with one or more known salt forming agents in an amount sufficient to react with any unwanted organic acids present in the composition thereby forming particulate salt precipitates;

filtering the coolant composition through any suitable filtration membrane or other separation means such as an ion exchange medium, capable of removing particulate precipitates and/or divalent dissolved metals therefrom;

adding to the coolant composition one or more suitable corrosion inhibitors selected from the group consisting of phosphates, phosphonates, silicates, borates, nitrites, nitrates, azols, modified acrylates and molybdates; and introducing into the coolant composition one or more known buffering agents in an amount sufficient to adjust the pH of the final solution to between about 9.5 and 10.5 thereby providing a recycled coolant composition having corrosion capabilities superior to that of the original coolant composition prior to removal from the system and preferably superior to the circulating coolant present in the system when inhibited antifreeze is initially added thereto.

Thereafter, an alcohol and/or glycol component, preferably 100% ethylene glycol, in an amount sufficient to restore the freeze protection of the coolant down to about −34° F., is added to the coolant composition.

A chemical additive has been developed for use in carrying out the process of the present invention which initiates and maximizes the amount of oxidation and precipitation occurring within the coolant composition. This chemical additive includes a solvent such as zeolite softened or demineralized water; an alkali metal hydroxide for neutralizing or forming salt precipitates with any unwanted organic or inorganic acids; a borate for use as a buffer to increase the pH of the recycled coolant to a range of about 9.5 − 10.5; a nitrite, molybdate, or an azole as corrosion inhibitors to restore the corrosion inhibition capabilities of the coolant composition; a surfactant to prevent cavitation from forming in the engine, a polymeric anionic dispersant, a deposit control agent and a sequestering agent to retard the precipitate of metallic ions out of the recycled coolant.

An apparatus for use in accordance with the process of the present invention for recycling an engine coolant composition is also described herein.

DETAILED DESCRIPTION

The term "coolant composition" or "coolant solution" or "coolant", as used herein, refers to a composition which may contain freezing point depressing amounts of at least one alcohol, at least one glycol, or mixtures of one or more alcohol and glycol and water. The alcohol, glycol or alcohol-glycol mixture may comprise about 20% to 90% by volume of the aqueous coolant, preferably about 50% by volume. Any of the water soluble alcohols and glycols known in the antifreeze or coolant art may be used, including methanol, ethanol, propanol, ethylene glycol, propylene glycol, diethylene glycol, dipropylene glycol, triethylene glycol, glycerol, and glycol ethers of various types. Mixtures of ethylene glycol and diethylene glycol are particularly preferred.

The term "used engine coolant composition" or "used coolant composition" or "used coolant", as used herein, refers to any engine coolant containing an antifreeze solution having undergone partial or complete degradation wherein the coolant exhibits a pH below 10.5 and lacks the ability to impart freeze protection to the coolant down to at least about −34° F.

The process in accordance with the present invention comprises contacting the used coolant with one or more oxidizing agents to reduce the unwanted dissolved metals and metal based corrosion by-products present in the coolant composition into metallic oxides. The dissolved metals may typically include iron, copper, zinc, aluminum, lead and steel. The oxidation is carried out preferably by means of aeration. This is, adding a sufficient amount of gaseous oxygen to the coolant to accelerate the oxidation of the dissolved metals into solid metal oxide precipitates which are readily removed from the coolant. Atmospheric oxygen is preferred and is typically added by agitating the coolant in the presence of ordinary air. Oxygen gas may also be bubbled through the solution to expedite oxide formation. It has been found that contacting the solution with ordinary air for at least about 10 minutes is sufficient to oxidize most of the metals present in the solution. However, continuous aeration is preferred. It is also understood that any suitable chemical oxidizing agent may be substituted for or used in addition to the gaseous oxygen and still be within the scope of the present invention. Such an agent might include but is not limited to hydrogen peroxide.

In addition to aeration, one or more known salt forming agents, i.e., bases, are added to the used coolant in an amount sufficient to react with any organic or inorganic acid by-products present in the coolant solution to form salt precipitates thereof. Such acids are formed from the breakdown of the glycol component. For example, when ethylene glycol is present in the coolant it typically undergoes degradation forming various organic acids as follows:

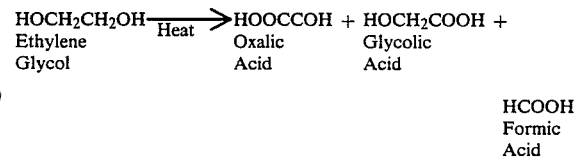

$$\text{HOCH}_2\text{CH}_2\text{OH} \xrightarrow{\text{Heat}} \text{HOOCCOH} + \text{HOCH}_2\text{COOH} +$$
Ethylene Glycol — Oxalic Acid — Glycolic Acid HCOOH
Formic Acid Upon the addition of a suitable base the formation of the solid salt precipitate occurs which may be readily removed from the used coolant solution. Illustrative bases would include the following (although any known base can be used): ammonium hydroxide, alkali metal hydroxides, amines and alkaline earth metal hydroxides. Alkali metal hydroxides such as potassium hydroxide and sodium hydroxide are preferred. Typical acids which may be precipitated out as alkali metal salts include glycolic acid, forming acid, oxalic acid, glyoxylic acid and acetic acid. The amount and type of a particular salt forming agent to be added to the solution will depend on simple stoichiometric considerations which are well known in the art.

Once the metal oxides and salts begin precipitating out of the used coolant solution any suitable filtration membrane or other separation means may be used to remove the precipitates from the solution. High flow, chemically inert, reusable filters are used to remove the precipitated impurities and degradation by-products in the used anti-freeze. Preferably, the solution is passed through at least two filters (i.e., 1-5 micron and/or 20-30 micron) arranged in series. Any high flow, chemically inert filtration system may be used, but inert cellulose filters have proven to be particularly effective for the process. Many other well known filtration means may be employed to remove precipitated impurities and several combinations of filtration means may be used in accord with the process described herein and still be within the scope of the present invention. Usually, about thirty minutes of filtration per 100 gallons of used coolant is required, but this time will very depending upon the type of filtration system used.

Following oxidation, precipitation and filtration, the coolant solution may be optionally passed through any known ion exchange resin to remove low concentrations of hardness and heavy metals from solution. Several such ion exchange media are known and would be operable herein. For example, the chelate forming cation exchange resin made by Sybron Chemicals Inc. is particularly well suited for the selective removal of divalent metal ions by forming complexes thereof. Also suitable for use herein are the carboxylic weak acid exchange resins.

During filtration, the pH of the solution is measured using standard medium range test paper for alkaline solutions to determine if the used coolant has been sufficiently recycled or reconditioned. A recycled or reconditioned coolant will typically have a pH in the range of 9.5–10.5, preferably about 10.0. Generally, the recycling process is considered to be complete when this pH range is obtained. Thereafter the freeze protection of the recycled coolant composition is determined using a conventional refractometer. For example, a coolant compositions having a 50:50 mixture of ethylene glycol and water provides freeze protection down to about −34° F. A used coolant composition typically exhibits diminished freeze protection and is usually protected only down to about 0° F. To restore the freeze protection to manufacturer's specification, i.e., between about −10° F. and −34° F., a solution of ethylene glycol and/or alcohol is added and mixed with the coolant solution.

With reference to Table A, the figures shown therein are intended for use as a starting point in determining how much 100% ethylene glycol to add to each 100 gallons of recycled coolant. The glycol is added slowly allowing mixing with the coolant for at least 10–15 minutes prior to taking another refractometer reading to determine the freeze protection. It is understood, depending on whether a glycol and/or alcohol based antifreeze component is used, that the type and amounts to lower freeze protection of the solution may vary.

TABLE A

| Actual Freeze Point per 100 Gallons of Coolant | Suggested Starting Point of 100% Ethylene Glycol to add |
|---|---|
| 0° F. | 6 Gallons |
| −10° F. | 5 Gallons |
| −20° F. | 3 Gallons |
| −30° F. | 2 Gallons |
| −35° F. | 0 Gallons |

It is understood that the oxidizing agent(s), salt forming agent(s), corrosion inhibitor(s) and buffering agent(s) may be added to the coolant solution individually in accord with the process described herein. However, is is also within the scope of the present invention to combine the individual process components into one chemical additive composition. To this effect a chemical additive composition has been developed and contains a combination of ingredients selected to: oxidize or precipitate the dissolved metals in the used coolant; neutralize or precipitate the organic acids therein; and adjust the pH of the final solution. Optionally, it may also contain corrosion inhibitors, dispersants, surfactants, wetting agents, sequestrants, common ions of the acid degradation by-products and trace amounts of any other known ingredients in the antifreeze art.

The corrosion inhibitors which may be incorporated into the chemical additive are selected from the group consisting of phosphates, phosphonates, silicates, borates, nitrites, nitrates, azols, modified acrylates and molybdates and any other corrosion inhibitor known in the antifreeze art. The preferred corrosion inhibitors which may be incorporated into the chemical additive composition comprise a nitrite and/or a nitrate, azole and molybdate component. The nitrite and/or nitrate component must be water soluble and therefore alkali metal nitrites or nitrates are preferred, particularly the sodium salts. The nitrite and/or nitrate component will comprise at least 0.25% to about 15% by weight of the composition. About 0.75% by weight of sodium nitrite is particularly preferred. The nitrite and/or nitrate component is an effective corrosion inhibitor for cast iron and steel surfaces.

The azole component generally includes thiazoles, triazoles, salts thereof, such as the alkali metal salts, and any mixture of two or more thereof. Typical azoles include 1-mercaptobenzothiazole, 1,2,3-benzotriazole, tolytriazole, and the sodium salts thereof. Preferably, sodium tolytriazole will comprise at least 0.1% to about 5.0% by weight, and most preferably 1.0% by weight of the total composition. The azole is an effective corrosion inhibitor for copper and its alloys.

The molybdate component must likewise be water soluble and therefore alkali metal salts of molybdates are preferred, such as sodium molybdate, the dihydrate being particularly preferred. The molbdate will comprise at least 0.25% to about 15% by weight, and preferably about 1% by weight of the total composition. The molybdate component is an inhibitor for steel, cast iron and aluminum surfaces.

The chemical additive composition also includes suitable basic and/or acidic compounds such as borates, hydroxides and silicates to adjust and maintain the pH of the final coolant solution in the range of about 9.5 to 10.5. Buffering agents, sodium tetraborate being particularly preferred, are effective to increase the pH of the final coolant solution. The borate component will comprise at least 0.5% to about 5.0% by weight, and preferably 1.0% by weight of the total composition.

The chemical additive composition further includes suitable salt forming agents in an amount sufficient to react with any organic or inogranic acid by-products present in the coolant solution to form salt precipitates thereof. Alkali metal hydroxides, preferably flakes or beads, or any other known bases which neutralize and/or precipitate as a salt thereof the acid by-products is within the scope of the present invention. The preferred alkali metal hydroxides are sodium hydroxide and/or potassium hydroxide and will comprise at least 0.5% to about 15% by weight of the total composition. About 1.0% by weight of sodium hydroxide and 0.25% by weight of potassium hydroxide being most preferred.

Optionally an anionic polymeric dispersant may also be added to the chemical additive for dispersing solids which may be present or generated in the cooling system and preventing the metals from dropping out of solution. Typical polymeric dispersants include water soluble carboxylic acid polymers such as styrene maleic anhydride copolymer or an amide/imide. The preferred dispersant is a modified acrylate copolymer, having a molecular weight of about 4500 and will comprise at least 0.1% to about 12% by weight, and preferably about 2.0% by weight of the total composition. The most preferred acrylate copolymer is Rohm and Haas WTD-1 but other polymers exhibiting similar characteristics may be substituted therefor. A surfactant also may be present in the chemical additives which prevents cavitation corrosion due to foam formation and mineral scale build-up. Typical surfactants i.e., anti-foaming agents, include silicone emulsions and/or polyglycols. The preferred surfactant is polyalkaline glycol (50-HB-5100) and will comprise at least 0.1% to about 3.0% by weight, and preferably about 0.5% by weight of the total composition. It is understood that any surfactant exhibiting similar characteristics to that of polyalkaline glycol (50-HB-5100) may be substituted and still be within the scope of the present invention.

In Clifton, et al, "DEGRADED AQUEOUS GLYCOL SOLUTIONS: pH VALUES AND THE EFFECTS OF COMMON IONS ON SUPPRESSING pH DECREASES", Solar Energy Materials, 12 pgs. 77–86 (1985), herein incorporated by reference, it was shown that common ions (anions of the acid degradation products) are effective in suppressing the degradation of ethylene glycol and propylene glycol used in flat-plate solar collector systems into organic acid by-products and consequently, effective in suppressing the decrease in pH of the solution. The chemical additive of the present invention will also comprise the salts of the organic acid by-products. Specifically, the composition will include, in amounts sufficient to have a suppressing effect on the degradation of the ethylene glycol, the alkali metal and/or alkaline earth metal salts of the acids glycolic, formic, oxalic and glyoxylic. More preferred, sodium glycolate, sodium formate, sodium oxalate and sodium glyoxylate.

Optionally, a dye capable of imparting a yellow-green or blue-green color to the final reconditioned solution may also be incorporated within the chemical additive or it may be added to the coolant solution directly. Preferred dyes are selected from the family of Alizarine Cyanine Green G Extra 100%, Uranine and/or anthene or acid family permanent dyes. The dye is added to the coolant solution to give an aesthetically pleasing appearance to the final product and to distinguish it from clear water.

The remainder of the chemical additive will comprise a known solvent, typically water. The preferred solvent being Zeolote softened or de-mineralized water.

The following table sets forth a preferred formulation for the chemical additive utilized in the recycling process of the present invention wherein the compositional ranges of the various components are by weight percent of the total composition.

TABLE B

| | |
|---|---|
| a. | From about 0.5 to about 15 percent of one or more known salt forming agents; |
| b. | From about 0.1 to about 15 percent of one or more known corrosion inhibiting agents; |
| c. | A buffer compound in an amount sufficient to maintain the pH of the additive in the range of about 9.5 to about 10.5; |
| d. | From about 0.1 to about 3.0 percent surfactant; |
| e. | From about 0.1 to about 12 percent polymeric dispersant; |
| f. | Balance aqueous solvent. |

The following table sets forth a more preferred formulation for the chemical additive utilized in the recycling process of the present invention wherein the compositional ranges of the various components are by weight percent of the total composition.

TABLE C

| | |
|---|---|
| a. | From about 0.1 to about 5.0 percent sodium tolytriazole. |
| b. | From about 0.1 to about 12.0 percent acrylate copolymer. |
| c. | From about 0.1 to about 3.0 percent polyalkylene glycol. |
| d. | From about 0.25 to about 15.0 percent sodium molybdate |
| e. | From about 0.25 to about 15.0 percent sodium nitrite. |
| f. | From about 0.5 to about 5.0 percent sodium tetraborate. |
| g. | From about 0.5 to about 15.0 percent potassium hydroxide. |
| h. | From about 0.5 to about 15 percent sodium hydroxide. |
| i. | Balance solvent. |

The following table sets forth a still more preferred formulation for the chemical additive composition utilized in the recycling process of the invention wherein the compositional ranges of the various components are by weight percent of the total composition.

TABLE D

| | |
|---|---|
| a. | About 1.0 percent sodium tolytriazole. |
| b. | About 2.0 percent acrylate copolymer. |
| c. | About 0.5 percent polyalkylene glycol. |
| d. | About 1.0 percent sodium molybdate. |
| e. | About 0.75 percent sodium nitrite. |
| f. | About 1.0 percent sodium tetraborate. |
| g. | About 0.25 percent potassium hydroxide. |
| h. | About 1.0 percent sodium hydroxide. |
| i. | From 0.1 to about 10 percent glycolate, oxylate or formate salts. |
| j. | Balance solvent; preferably zeolite softened or demineralized water. |

The chemical additive developed for use in accordance with the present invention is added to the used coolant after the initial pH reading is obtained. The amount of the chemical additive added to the solution depends upon the starting pH of the used coolant. Used coolant typically has a pH in the range of 8.6–9.2, and sometimes below 8.0. The objective is to yield a recycled coolant solution with a pH of about 10.0 With reference to Table E, the amounts shown therein are intended for use as a starting point in determining how much chemical additive will be required to recycle or recondition each 100 gallons of used coolant solution.

TABLE E

| Actual pH reading per 100 Gallons of Coolant | Starting Quantity Chemical Additive |
|---|---|
| 7.0–7.5 | 3 Gallons |
| 7.5–8.0 | 2.5 Gallons |
| 8.0–8.5 | 2 Gallons 1 Quart |
| 8.5–9.0 | 2 Gallons |
| 9.0–9.5 | 1 Gallon |

BRIEF DESCRIPTION OF THE DRAWINGS

The process of the present invention may be more fully understood when considered in connection with the apparatus of the present invention. With reference to FIG. 1, there is illustrated one embodiment of the apparatus of the present invention, generally indicated 10. Apparatus 10 includes a container means 12 adapted to receive used coolant therein. Container 12 has an inlet portion 14 and an outlet portion 16. Any suitable container capable of retaining a liquid solution therein is within the scope of the present invention. Connected to inlet 14 and outlet 16 is a suitable circulating conduit means 15 such as PVC piping for circulating the coolant which is being recycled. Injector means 30 connected to the circulating means 15 in order to introduce the chemical additive previously described in accordance with the present invention to the used coolant. Any conventional container of sufficient type and size that permits the precise dispersement of fluid therefrom can be employed. Injector means 30 is connected to conduit 15 via a directional valve 19. Alternatively, the injector may be connected directly to container means 12.

Figure 2:
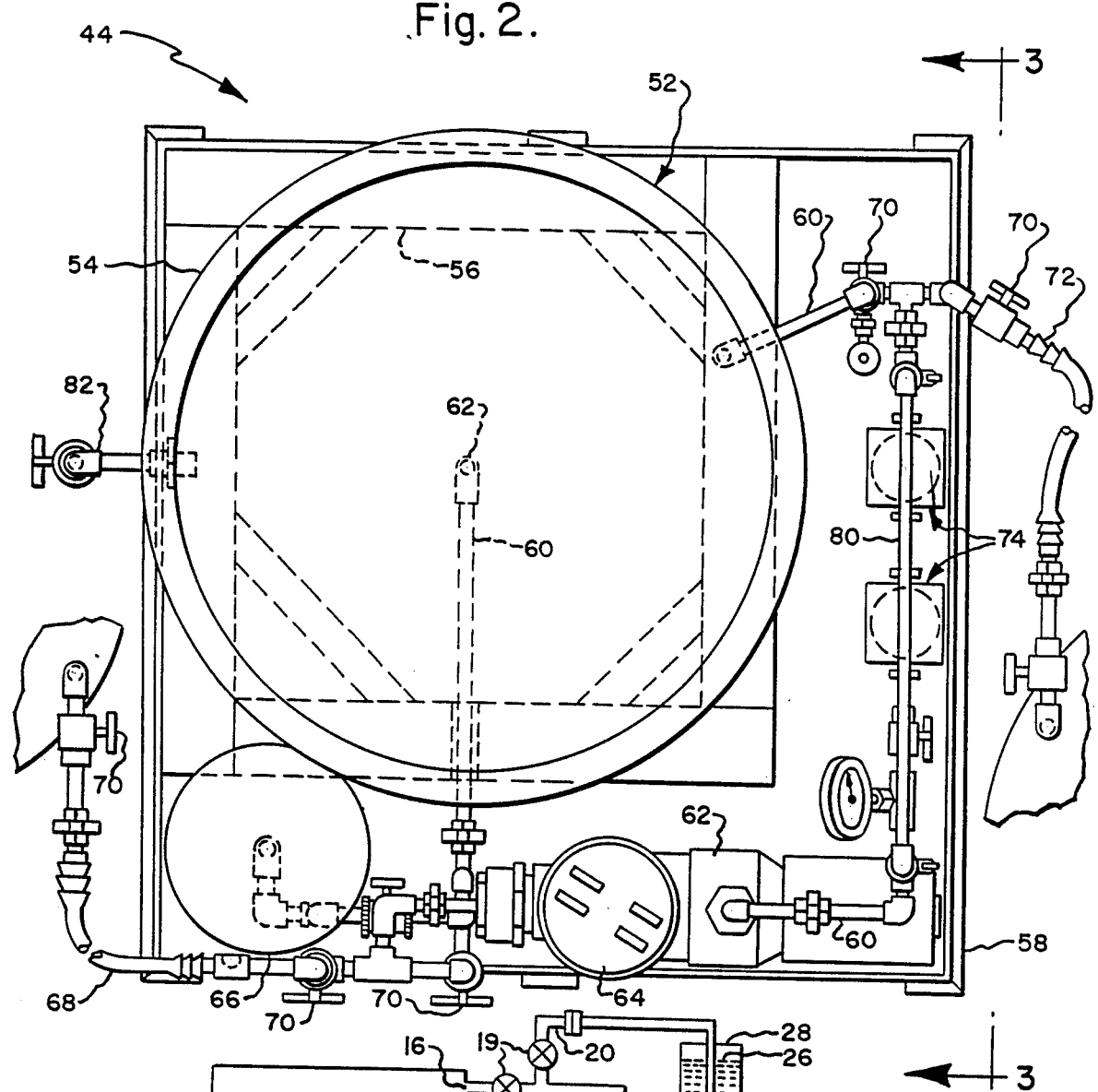
FIG. 2 discloses a top view of the preferred embodiment of the apparatus of the present invention.

Apparatus 10 further comprises a filtration means, generally indicated 32 for removing the impurities and dissolved particulate matter from the used coolant as it is circulated therethrough via conduit 15. The filtration means 32 is comprised of a pair of filters 34, 36 each having an inlet 38 and outlet 40. The filters 34,36 employed in the present invention are 1–5 and 20–30 micron filters, respectively. It is understood that any separation means could be employed in accordance with the present apparatus and still be within the scope of the present invention. Attached to conduit means 15 is a conventional pump for conveying the used coolant from container 12 through filtration means 32 via inlet 38 and outlet 40 therein, to cause removal of the impurities in the used coolant, and for returning the coolant through conduit 15 to container means 12 through via outlet 16. When the chemical additive is added through means 30, conduit means 15 further facilitates the mixing of the additive with the used coolant. Pump 42 also introduces air into contact with the used coolant via conduit 15 by an aspirator located in the container thereby causing the formation of metallic oxides from the dissolved metals present in the used coolant.

Attached to conduit 15 is an inlet conduit 18 for introducing the used coolant 22 from a storage barrel 24 into conduit 15 and therethrough to container 12 via inlet 14. This is accomplished by adjusting standard directional valve 19 in the appropriate direction to facilitate the flow of the used coolant into container 12. Likewise, attached to conduit 15 at the upper end of the apparatus neaar the outlet portion 16 is a means 20 for removing the recycled coolant from container 12 via outlet 16 and conduit 15 after the process has been completed for storage of the recycled coolant 26 in a clean storage barrel 28.

Figure 3:
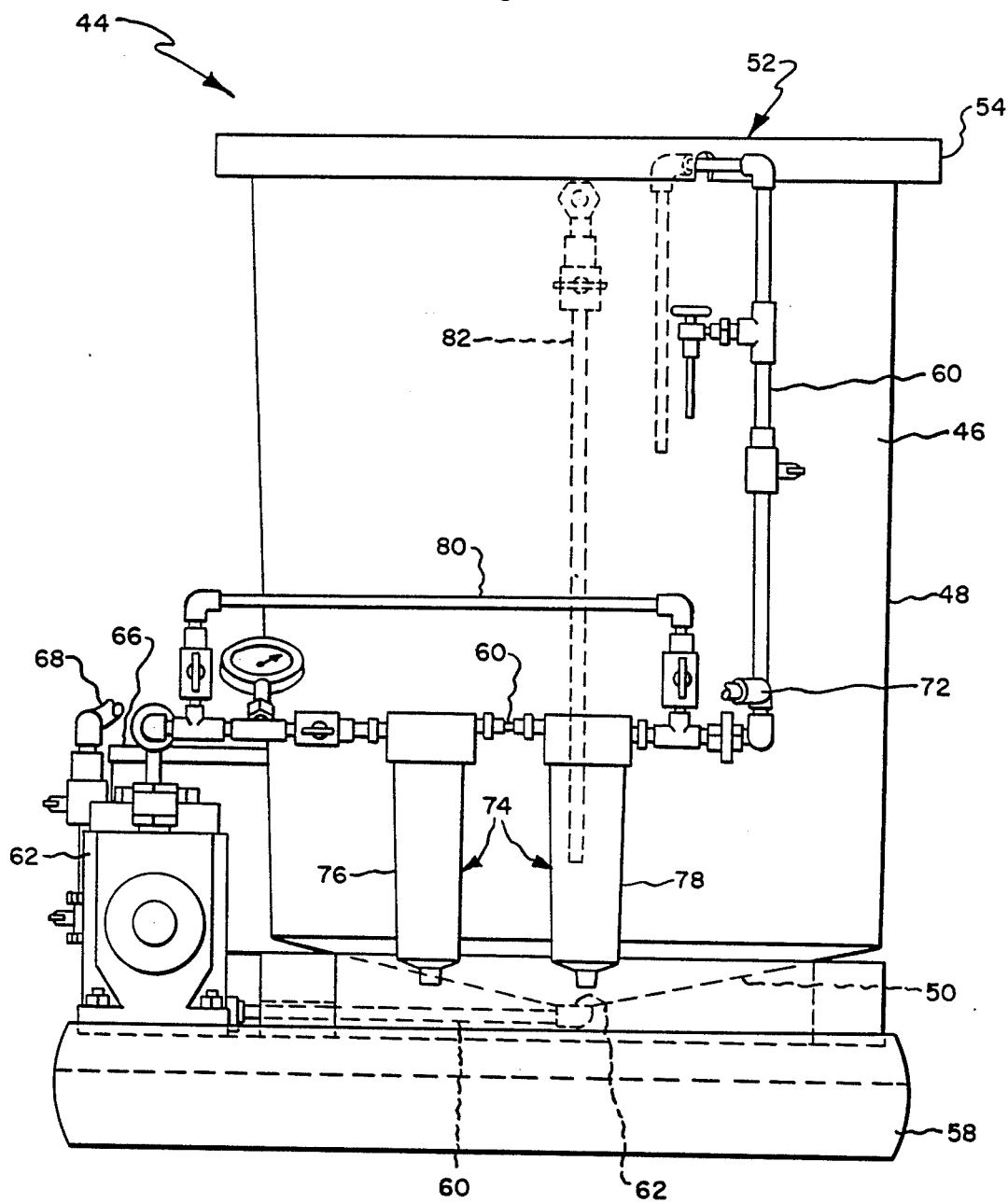
FIG. 3 discloses a side view taken about on line 3—3 in FIG. 2.

The preferred embodiment of the apparatus of the present invention for recycling used coolant in accordance with the process described herein is shown in FIGS. 2 and 3. The apparatus generally indicated 44 includes a container or tank 46 constructed of a polyethylene material having a side 48 and a conical shaped bottom 50 and an open top 52 bordered by a lip 54. The container or tank is mounted on a rectangular platform 56 which in turn is mounted with the rest of apparatus 44 onto pallet 58. A conduit pipe 60 is attached at the base of conical bottom 50 of container 46 for the flow of coolant from the container. The conduit 60 comprises an opening 62 which opens into the inner portion of container 46 for receiving the used coolant therethrough. The conduit of the present apparatus is PVC piping having reinforced joints. The PCV piping is connected to the container in such a manner such that the used coolant is circulated therethrough from and back to the container. Connected to the conduit piping 60 is a Nordel self-priming pump 62 for circulating the coolant through the system. The pump 62 is constructed of a plastic material and has a strainer basket 64 for filtration purposes. The motor is drip proof 1½ horsepower at 3450 rpm, 110/208 volts. It is understood that any conventional motor pump can be utilized in the apparatus of the present invention. The pump also functions to introduce a sufficient amount of aeration into the system thereby causing the oxidation of the dissolved metals therein to form metallic oxides thereof. Attached to the conduit piping 60 is a shot feeder 66 for introducing the chemical additive of the present invention into the used coolant. For purposes of illustration only and not limitation, the shot feeder 66 shown herein is 3½ gallon container and is made of polyethylene, and connected by pipe 60 to the suction side of the pump. Further attached to conduit 60 is an inlet member 68 adapted to introduce the used coolant into container 46 via conduit 60 by adjusting the specific directional valves 70 in the appropriate position to allow the flow of the fluid inward toward container 46. The apparatus also has a similar outlet means 72 for removing the recycled coolant from container 46 by turning the appropriate valves 70. The filtration system of the present invention comprises two high-flow chemically inert reusable cartridge filters constructed of any cellulose type media generally indicated 74. As best viewed in FIG. 3, the filters are constructed in series with one another. The first filter 76 is a 25 micron filter designed to remove the larger by-products and particulate precipitate matter in the used coolant. The second filter 78 is a 5 micron filter designed to removed the smaller dissolved particles in the used coolant. A pressure gauge 80 indicates to the user when the filters need to be cleaned due to pressure buildup from the used coolant not flowing through the filters because of clogging. A by-pass conduit pipe 80 is included in the apparatus for allowing the circulation of the coolant without passing through the filters 76 and 80. This is desired when the user is either filling the apparatus with used coolant or removing the recycled coolant therefrom. Also a tube 82 is adapted to be connected to the top of container 46 for removing the upper layer of coolant which may also contain various types of other contaminants such as oils.

Figure 1:
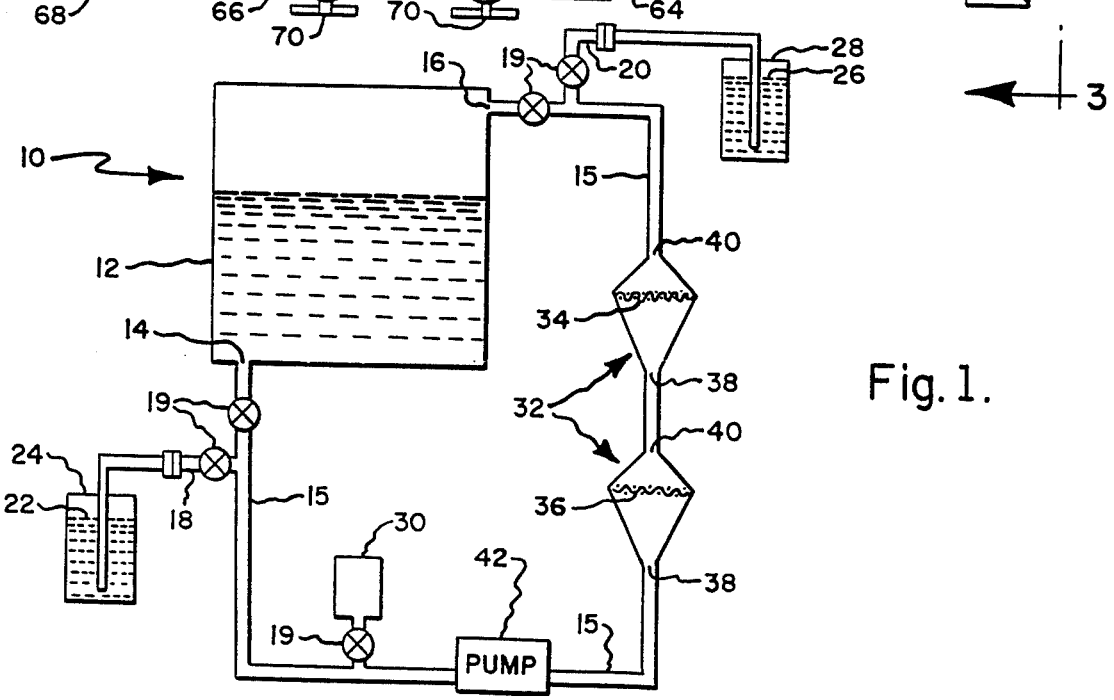
FIG. 1 discloses one embodiment of the apparatus of the present invention.

An optional embodiment (not shown) would include the placement of a cylinder or other suitable housing containing from about 1–4 pints of a suitable ion exchange resin of the type described earlier herein, preferably Sybron Chemicals Inc. Ionac SR-5 base metal selective chelating resin. The container for the ion exchange resin should be attached to apparatus 10 in a manner permitting the used coolant to circulate therethrough. For ease of construction the ion exchange resin container will preferably be attached immediately adjacent to outlet portion 16 (FIG. 1).

EXAMPLE 1

A hundred gallons of used coolant was introduced into the apparatus container through the heavy duty suction hose via a 55 gallon storage drum. The pump was engaged allowing the used coolant to circulate through the 25 micron and 5 micron filters for approximately 5 minutes. Thereafter a sample of the used coolant was withdrawn from the container and the pH of the sample was measured using standard medium range test paper for alkaline solutions. The pH was found to be 8.8. Thereafter the chemical additive comprising 1% sodium tolytriazole, 2% acrylate copolymer, 0.5% polyalkaline glycol, 1% sodium molybdate, 0.75% sodium nitrite, 1% sodium tetraborate, 0.25% potassium hydroxide, 1% sodium hydroxide and about 92.5% solvent was added through the shot feeder in accordance with the specific amount indicated in Table B, based on the pH of the sample i.e., 2 Gallons. The used coolant and additive was allowed to mix while circulating through the filtration apparatus for about 10 to 15 minutes. A new sample was taken and the pH was found to be about 9.9. A refractometer reading was then taken by depositing a two or three drop sample of antifreeze removed from the container under the hinged plastic cover on the glass plate of the refractometer. The reading indicated freeze protection to $-10°$ F. Since it is desirable to provide the coolant with freeze protection down to $-34°$ F., sufficient 100% ethylene glycol was added to the 100 gallons of recycled filtered coolant in accord with the amount indicated in Table A. The 100% ethylene glycol was allowed to mix for about 10-15 minutes with the coolant prior to taking another refractometer reading which indicated freeze protection down to about $-34°$ F. The recycled and reconditioned coolant was thereafter removed from the apparatus via the discharge hose into a clean storage drum.

The process described above in Example 1 was repeated over a period of two years on used coolant solutions removed from the engine cooling systems of 2200 vehicles. The recycled coolant obtained in accordance with the process of the present invention was reintroduced into the vehicles after treatment and tested after an extended period of use of about 2 years. A corrosion test was employed on the recycled coolant pursuant to standard test ASTM D-1384 under conditions of 190° F. for two weeks and 260° F. for two weeks utilizing 50% glycol and 50% de-ionized water, with air bubbling. The corrosion rate in MPY (mils per year) of 0.001 inch metal loss per year is indicated in Table F using comparisons for tap water, for coolant solution containing commercially available un-inhibited and commercially available inhibited ethylene glycol antifreeze compositions and the recycled engine coolant in accordance with the present invention.

TABLE F

| Metal | Tap Water | Un-inhibited Ethylene Glycol | Inhibited Ethylene Glycol | Recycled Engine Coolant |
|---|---|---|---|---|
| Copper | 0.09 mpy | 0.22 | 0.13 | 0.08 |
| Solder | 3.25 mpy | 46.3 | 0.12 | 0.06 |
| Brass | 0.36 mpy | 0.44 | 0.09 | 0.09 |
| Steel | 10.01 mpy | 48.3 | 0.03 | 0.03 |
| Cast Iron | 19.3 mpy | 58.3 | 0.12 | 0.08 |
| Aluminum | 16.3 mpy | 21.0 | 0.52 | 0.14 |

The recycled coolant in accordance with the process of the present invention showed a significant decrease in corrosion rate when compared to tap water and the coolants containing the inhibited and uninhibited ethylene glycol. Based on the above data the recycled coolant obtained as a result of the inventive process herein described exhibits superior corrosion inhibition capabilities to that of coolant compositions containing standard antifreeze compositions currently on the market.

It will be understood that the foregoing description and illustration is by way of example only and that such modifications and changes as may suggest themselves to those skilled in the art are intended to fall within the scope of the present invention as defined by the appended claims.

What is claimed is:

1. A process for physically and chemically treating a used coolant composition of the type used within an internal combustion engine cooling system, after removal from said system, to remove unwanted impurities and degradation by-products including dissolved metals, dirt, silt, salts and other unwanted suspended particulate matter contained therein, said coolant composition containing one or more glycol and/or alcohol-based antifreeze components, said process comprising:

contacting said coolant composition with one or more known oxidizing agents in an amount sufficient to form metallic oxides from any unwanted dissolved metals present in said composition thereby forming particulate metallic oxide precipitates;

contacting said coolant composition with one or more known salt forming agents in an amount sufficient to react with any unwanted organic acids present in said composition thereby forming particulate salt precipitates;

filtering said coolant composition through any suitable filtration membrane or other separation means capable of removing particulate precipitates therefrom;

adding to said coolant composition one or more suitable corrosion inhibiting agents selected from the group consisting of phosphates, phosphonates, silicates, borates, nitrites, nitrates, azols, modified acrylates and molybdates; and introducing into said coolant composition one or more known buffering agents in an amount sufficient to adjust the pH of the final solution to between about 9.5 and 10.5 thereby providing a recycled coolant composition having corrosion capabilities equal or superior to that of the original coolant composition prior to removal.

2. The process of claim 1, wherein said process further comprises the step of:

mixing with said recycled coolant composition one or more additional antifreeze components selected from the group consisting of glycols and alcohols in an amount sufficient to provide freeze protection for said recycled coolant down to the range of about $-10°$ F. to about $-34°$ F.

3. The process of claim 2, wherein said glycol is ethylene glycol.

4. The process of claim 1, wherein said process further comprises contacting said recycled coolant composition with an ion exchange resin to substantially remove any remaining divalent metals in dissolved form.

5. The process of claim 4, wherein said ion exchange resin is a chelate forming cation exchange resin specific for the selective removal of divalent metal ions.

6. The process of claim 1, wherein said oxidizing agent is selected from the group consisting of gaseous oxygen, atmospheric oxygen and hydrogen peroxide.

7. The process of claim 1, wherein said oxidizing agent is atmospheric oxygen.

8. The process of claim 7 wherein the atmospheric oxygen is introduced into said coolant by the process of aeration.

9. The process of claim 1, wherein said salt forming agent is selected from the group consisting of alkali metal hydroxides, alkaline earth metal hydroxides, ammonium hydroxide and alkyl amines or a combination thereof.

10. The process of claim 9, wherein said alkali metal hydroxides are selected from the group consisting of sodium hydroxide and potassium hydroxide or a combination thereof.

11. The process of claim 1, wherein said separation means includes at least 2 chemically inert filters.

12. The process of claim 11, wherein said filters are arranged in series.

13. The process of claim 12, wherein said filters are capable of removing particulate matter of a size greater than 1 micron.

14. The process of claim 1, wherein said corrosion inhibitors are selected from the group consisting of azols, molybdates and nitrites or a combination thereof.

15. The process of claim 14, wherein said azoles are selected from the group of thiazoles, triazoles, salts thereof and any combination thereof.

16. The process of claim 15, wherein said azols are selected from the group consisting of tolytriazole, mercaptobenzothiazole or benzothiazole, alkali metal salts thereof, and any combination thereof.

17. The process of claim 14, wherein said molybdate is an alkali metal salt form thereof.

18. The process of claim 14, wherein said nitrites are selected from the group consisting of sodium nitrite, and potassium nitrite.

19. The process of claim 1, wherein said buffering agent is selected from the group consisting of borates, alkali metal and alkaline earth metal hydroxides or combinations thereof.

20. The process of claim 19, wherein said borate is sodium tetraborate.

21. The process of claim 1 wherein said oxidyzing agents, salt forming agents, corrosion inhibiting agents, and buffering agents are first combined into a single chemical additive and thereafter added to said coolant for the chemical treatment thereof.

22. The process of claim 21, wherein said chemical additive comprises by weight:
   a. from about 0.5 to about 15 percent of one or more known salt forming agents;
   b. from about 0.1 to about 15 percent of one or more known corrosion inhibiting agents;
   c. a buffer compound in an amount sufficient to maintain the pH of the coolant solution in the range of about 9.5 to about 10.5; and
   d. balance aqueous solvent.

* * * * *